United States Patent
Nagano et al.

(10) Patent No.: US 12,158,167 B2
(45) Date of Patent: Dec. 3, 2024

(54) HYDRAULIC DEVICE WITH POSITION SENSOR

(71) Applicant: YUKEN KOGYO CO., LTD., Ayase (JP)

(72) Inventors: Taku Nagano, Yokosuka (JP); Hiromori Ogata, Fujisawa (JP)

(73) Assignee: YUKEN KOGYO CO., LTD., Ayase (JP)

( * ) Notice: Subject to any disclaimer, the term of this patent is extended or adjusted under 35 U.S.C. 154(b) by 283 days.

(21) Appl. No.: 17/912,658

(22) PCT Filed: Mar. 29, 2021

(86) PCT No.: PCT/JP2021/013211
§ 371 (c)(1),
(2) Date: Sep. 19, 2022

(87) PCT Pub. No.: WO2021/200791
PCT Pub. Date: Oct. 7, 2021

(65) Prior Publication Data
US 2023/0135319 A1 May 4, 2023

(30) Foreign Application Priority Data
Apr. 2, 2020 (JP) .................. 2020-066526

(51) Int. Cl.
*F15B 13/04* (2006.01)
*F16K 37/00* (2006.01)

(52) U.S. Cl.
CPC .. *F15B 13/0401* (2013.01); *F15B 2013/0409* (2013.01); *F16K 37/0033* (2013.01)

(58) Field of Classification Search
CPC .......... F15B 13/0401; F15B 2013/0409; F16K 37/0033; F16K 37/0041; F16K 11/07
See application file for complete search history.

(56) References Cited

U.S. PATENT DOCUMENTS 4,133,511 A * 1/1979 Hartmann ........... F16K 37/0041
  251/215
4,347,869 A * 9/1982 Strobel ..................... F23N 3/02
  91/363 R (Continued)

FOREIGN PATENT DOCUMENTS

JP  H09-303328 A  11/1997
JP  H10-141305 A  5/1998

(Continued)

OTHER PUBLICATIONS

PCT/ISA/210, "International Search Report for PCT International Application No. PCT/JP2021/013211," Jun. 15, 2021.

*Primary Examiner* — Patrick C Williams
(74) *Attorney, Agent, or Firm* — HAUPTMAN HAM, LLP

(57) ABSTRACT

A hydraulic device with the position sensor feedback-controlled by a servo amplifier on the basis of a deviation between a command value of a command signal and a position sensing value from a position sensor includes: a computation processing section that outputs the position sensing value as a sensing signal; a communication device that transmits the sensing signal to the servo amplifier, and receives a signal from the servo amplifier; and a storage section storing characteristics information of the hydraulic device to be read via the communication device. The characteristics information at least includes: calibration information which is measured and acquired in advance in a test stand in a manufacturing process of the hydraulic device, and includes a position sensing value from the position sensor and a characteristics value of the hydraulic device, associated with each other; and flow rate characteristics information including a flow rate of the hydraulic device.

8 Claims, 7 Drawing Sheets

(56) References Cited

U.S. PATENT DOCUMENTS

| | | | |
|---|---|---|---|
| 2005/0218361 A1* | 10/2005 | Shajii | F16K 31/0665 |
| | | | 251/905 |
| 2013/0042476 A1 | 2/2013 | Carter et al. | |
| 2016/0077531 A1* | 3/2016 | Kucera | G05D 7/0647 |
| | | | 137/485 |
| 2017/0204885 A1* | 7/2017 | Valentin-Rumpel | F15B 11/04 |

FOREIGN PATENT DOCUMENTS

| | | |
|---|---|---|
| JP | 2002-090189 A | 3/2002 |
| JP | 2005-104292 A | 4/2005 |
| JP | 2011-074935 A | 4/2011 |
| JP | 2012-057776 A | 3/2012 |
| JP | 2015-535061 A | 12/2015 |
| JP | 2019-049336 A | 3/2019 |

\* cited by examiner

Fig. 8 (a)   Prior Art
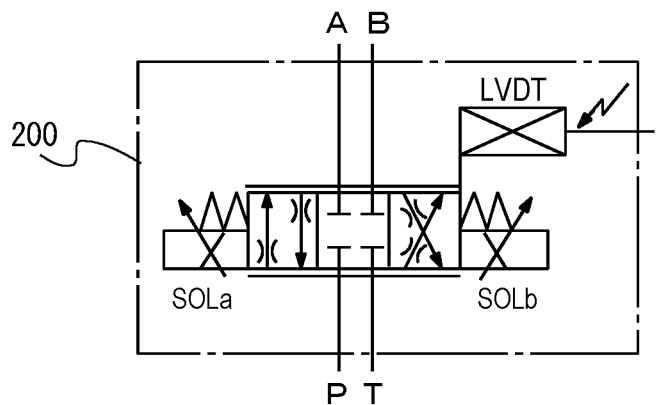
Fig. 8 (b)   Prior Art
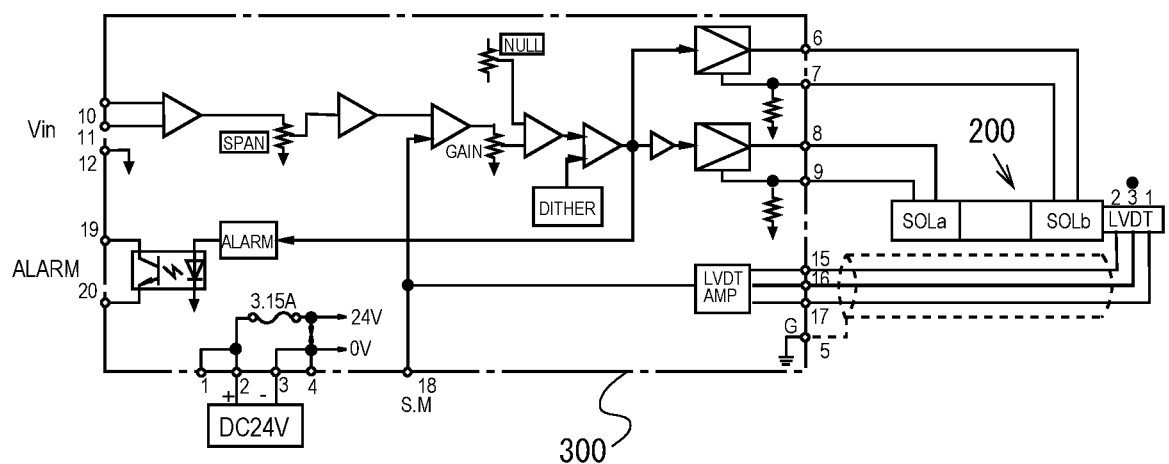

HYDRAULIC DEVICE WITH POSITION SENSOR

RELATED APPLICATIONS

The present application is National Phase of International Application No. PCT/JP2021/013211 filed Mar. 29, 2021, and claims priority from Japanese Application No. 2020-066526, filed Apr. 2, 2020, the disclosure of which is hereby incorporated by reference herein in its entirety.

TECHNICAL FIELD

The present invention relates to hydraulic device including a position sensor that senses movements of a valve member such as a spool of a hydraulic servo valve, for example, and specifically relates to the hydraulic device that, by including a storage section having stored in advance thereon characteristics information of the hydraulic device including calibration information for a position sensor, can be optimized simply by causing any servo amplifier to read out the characteristics information, and makes it possible to make simple and convenient an adjustment step in a manufacturing process and an adjustment step at a time when the hydraulic device is combined with a main machine.

BACKGROUND ART

For example, in hydraulic servo valves that drive main machines such as various types of hydraulic apparatus or actuator, a command signal is given from a controller or the like on the main machine-side to a servo amplifier connected to a power supply, a control current according to the command signal is supplied to a motor via the servo amplifier, and thereby a spool is moved to a valve opening position corresponding to a flow direction and flow rate of a hydraulic working fluid according to the command signal. In the servo amplifier, the command signal and a signal of a position sensing value of the current position of the spool sensed by a position sensor that senses the position of the spool are compared, and, on the basis of the deviation, the current supply is adjusted, and the movement amount of the spool is feedback-controlled.

Hydraulic servo valves include proportional electromagnetic direct-operated directional/flow rate control valves and direct-operated hydraulic linear servo valves in which the flow rate is changed and the flow path (direction) is switched by a linear movement of a spool that accompanies a movement of a moving core of an electromagnetic solenoid or a moving coil (voice coil) of a linear motor according to power supply excitation. Such hydraulic servo valves integrally include a differential transformer, in many cases an LVDT (Linear Variable Differential Transformer), as a position sensor for performing feedback control of a spool position (e.g. see Patent Literatures 1, 2 and 3). Such hydraulic servo valves are drive-controlled via a servo amplifier connected together with the position sensor.

For example, a proportional electromagnetic directional flow rate control valve 200 that includes a pair of solenoids (double solenoids: SOLa, SOLb) and an LVDT for spool position sensing depicted in (a) in FIG. 8, and is connected with a servo amplifier 300 as depicted in (b) in FIG. 8 has a four-port structure including a hydraulic working fluid inflow port P from a supply source, two ports A and B which are inlet and outlet ports for hydraulic control, and a port T for allowing the hydraulic working fluid to flow back to a tank. In the four-port structure, a spool moves inside the valve by driving of a solenoid that is excited by being supplied with a current on the basis of a command signal, thereby the flow rate of an inflow and outflow of each port is controlled, and the flow rates of both the ports A and B become zero when the spool is at the neutral point of the valve mechanism. That is, as the spool moves in one direction from the neutral point due to excitation drive of the first solenoid SOLa according to a command signal, the outflow flow rate of the port A increases, and also the flow rate of inflow to the port B increases. In addition, as the spool moves in the reverse direction due to excitation drive of the second solenoid SOLb, the outflow flow rate of the port B increases, and also the flow rate of inflow to the port A increases.

Note that, as depicted in FIG. 9, an LVDT typically includes: a core 203 that is fixed via a rod 202 that extends from an end of a spool 201 toward the outside of the valve body; a pipe member 204 into which the core 203 is inserted; and a sensing coil including a primary coil 205 wound at the middle of the periphery of the pipe member 204 and a pair of secondary coils 206 that are wound symmetrically on both sides of the primary coil 205. The primary coil 205 receives electrical power and undergoes primary excitation by an AC with a predetermined amplitude and frequency supplied via a servo amplifier, and differential voltages between the secondary coils 206 that change corresponding to the position of the core 203 in the coil that moves along with the spool 201 are output. Analog signals of the voltage outputs are digitized by A/D convertors, and then go through a computation processing section that perform signal processing, and digital sensing signals as position sensing values are obtained.

The installation length of the core 203 is finely adjustable by clamping of a screw structure 210 that fixes the rod 202 to the end of the spool 201, and the pipe member 204 is configured to be able to variably adjust the position of the LVDT body by clamping of a nut 230 from the outer end-side facing adjustment springs 220 sandwiched on the valve body-side.

In a case that a sensor is mounted on the hydraulic device in this manner, a position sensor is implemented in a manufacturing process of the hydraulic device, and it is essential to perform minute adjustment work of causing the origins of the position sensor and a control mechanism of the hydraulic device to match at a test stand after the implementation. Hydraulic servo valves like the ones described above also become products in a state that adjustment of causing the neutral zero point of a spool and the origin of a position sensor to match in advance is completed.

CITATION LIST

Patent Literature

Patent Literature 1: Japanese Unexamined Patent Application Publication No. H10-141305
Patent Literature 2: Japanese Unexamined Patent Application Publication No. H09-303328
Patent Literature 3: Japanese Unexamined Patent Application Publication No. 2012-57776

SUMMARY OF INVENTION

Technical Problem

Typically, adjustment and inspection in a test stand of the hydraulic device are performed by using an inspection amplifier installed at a hydraulic device manufacturing factory. Then, a servo amplifier that is to be actually incorporated into a main machine, and is for drive-controlling the hydraulic device is one that has been shipped after being adjusted and inspected under electrical conditions and in an electronic load simulating apparatus at a different factory dedicated for electronic equipment. Accordingly, the hydraulic device and servo amplifier installed on the main machine become usable in a real environment by being adjusted in combination.

That is, even if origin adjustment is performed in a manufacturing process as described above, different units of the hydraulic device have different hydraulic characteristics, and there are individual differences in the sensitivities of flow rates and the like in relation to positions in their control mechanisms and position sensing apparatuses. Accordingly, the hydraulic device and a servo amplifier that drive-controls the hydraulic device become usable in a real environment by adjusting flow rate characteristics and the like in combination when they are installed onto a main machine.

For example, flow rate characteristics in relation to spool movements of a hydraulic servo valve do not necessarily exhibit a linear constant proportional relationship. As depicted in a diagram of flow rate characteristics in relation to command signals in FIG. 10, flow rates, in relation to command signals (input voltages VDC) to a servo amplifier, of the directional flow rate control valve in (a) in FIG. 8 do not exhibit monotonical proportional characteristics, even if each different type is looked at. Due to a valve mechanism, around the input voltage 0 VDC, there is necessarily a range where there are almost no flow rate changes which is a so-called insensitivity zone, and saturation occurs as the input voltage approaches the maximum input voltage 10 VDC, in these flow rate characteristics.

In addition, because there are also variations in the shapes and dimensions of flow rate control mechanism sections of hydraulic servo valves, and linearity errors and variations also in movement sensing of position sensors, flow rate characteristics in relation to spool movements generate linearity errors and variations. Such flow rate errors cannot be corrected completely by only adjustment using the zero point and span at a servo amplifier, so correction is performed as control of a main machine such as a hydraulic cylinder.

That is, when a hydraulic servo valve and a servo amplifier are incorporated into a hydraulic cylinder as a main machine, test operation of the hydraulic cylinder is performed, and, while the hydraulic cylinder is caused to make reciprocating motions at a constant speed, adjustment is performed at the servo amplifier such that the neutral point of a valve mechanism of the hydraulic servo valve matches the stop point of the hydraulic cylinder, and the maximum flow rate of the valve maximum opening matches the maximum speed of the hydraulic cylinder. Particularly, flow rates according to the valve opening due to spool movements in relation to command signals exhibit non-linear characteristics, so, taking the valve characteristics into consideration, adjustment in relation to command signals for hydraulic cylinder speeds controlled by flow rates according to the valve opening is implemented in amplifier adjustment.

In addition, in a case that the hydraulic device of the same main machine is changed, it had been necessary to make an existing servo amplifier adapted to it by performing readjustment or to change the servo amplifier also. Particularly, because, regarding hydraulic servo valves, there are many types of special design, and new designs appear frequently, in a case that a new model is designed after a servo amplifier is designed or a hydraulic servo valve is replaced with a hydraulic servo valve whose design has been changed, it is very cumbersome to perform readjustment of the servo amplifier, so the servo amplifier is often replaced with a paired servo amplifier that has been adjusted together with a new hydraulic servo valve. That is, there are some types of the hydraulic device that are shipped as integrated products after performing adjustment in combination with a servo amplifier at a test stand of a manufacturing factory. Such integrated products do not require test operation adjustment in a real environment like the one described above, but there is significant manufacturing burden, and also both the hydraulic device and a servo amplifier need to be replaced as a pair even in a case that only one of them malfunctioned.

On the other hand, there are also the hydraulic device products on which a dedicated servo amplifier is mounted (e.g. see Patent Literature 3). According to this configuration, cable wiring can be simplified, and also it is possible to enhance simpleness and convenience at a time of incorporation into a main machine by implementing, in a test stand of the hydraulic device in a manufacturing process, adjustment of individual differences of a control mechanism and a sensor of the hydraulic device by adjustment of a mounted servo amplifier. However, an installation environment of the hydraulic device installed on a main machine is very bad for a servo amplifier in many cases because of high temperature, pouring of water and the like. In addition, there are design-related constraints on a mounted servo amplifier such as the necessity for a size reduction, and because of this, it is necessary to compromise on functionalities and performance as a servo amplifier in terms of lowering of electrical power and the like, undesirably. Particularly, a large-sized direct-operated hydraulic servo valve increases the drive power of a motor, so it is difficult and thus is not practical to mount a servo amplifier.

In view of the problems described above, an object of the present invention is to provide the hydraulic device with a position sensor that can realize simpleness and convenience of an adjustment step in a manufacturing process, and also simpleness and convenience of an adjustment step at a time of incorporation into a main machine to an extent which is equivalent to or more than in a case that the hydraulic device is formed into a product on which a paired servo amplifier is integrated or a servo amplifier is mounted, without adopting the configuration of such an integrated product.

Solution to Problem

In order to achieve the object described above, the hydraulic device with the position sensor related to the invention according to claim 1 is the hydraulic device with the position sensor that is the hydraulic device drive-controlled by a servo amplifier in accordance with a command signal, integrally includes a position sensor that generates an output signal according to a position of a valve member that determines a valve opening and a hydraulic working fluid flow direction, and is feedback-controlled by the servo amplifier on a basis of a deviation between a command value of the command signal and a position sensing value based on the output signal, the hydraulic device with the position sensor including:

a computation processing section that performs a computation process on an output from the position sensor, and outputs the position sensing value as a sensing signal;

a communication device that transmits the sensing signal to the servo amplifier, and also receives a signal from the servo amplifier; and a storage section having stored thereon characteristics information of the hydraulic device such that the characteristics information can be read out via the communication device, in which the characteristics information of the hydraulic device stored on the storage section at least includes calibration information and flow rate characteristics information which are measured and acquired in advance in a test stand in a manufacturing process of the hydraulic device, the calibration information including a position sensing value from the position sensor and a characteristics value of the hydraulic device, which values are associated with each other, and the flow rate characteristics information including a flow rate of the hydraulic device in relation to the command signal, which flow rate and command signal are associated with each other.

The hydraulic device with the position sensor related to the invention according to claim 2 is the hydraulic device with the position sensor according to claim 1, in which the characteristics information of the hydraulic device stored on the storage section further rewritably includes a control program and control constants that are compatible with the hydraulic device.

The hydraulic device with the position sensor related to the invention according to claim 3 is the hydraulic device with the position sensor according to claim 1 or 2, in which the storage section further has stored thereon a current setting value for abnormality detection for comparison with a drive current measurement value measured by moving the valve member at each instance of activation of a main machine in which the hydraulic device is incorporated.

The hydraulic device with the position sensor related to the invention according to claim 4 is the hydraulic device with the position sensor according to claim 3, wherein the storage section has stored thereon, as a drive current initial value, a drive current value measured by moving the valve member before shipment of the hydraulic device, and also has a functionality of storing a drive current measurement value at each instance of activation of the main machine, and accumulating the drive current measurement value over time.

The hydraulic device with the position sensor related to the invention according to claim 5 is the hydraulic device with the position sensor according to any one of claims 1 to 4, wherein the computation processing section, the communication device and the storage section are integrally provided in the same housing with the position sensor.

The hydraulic device with the position sensor related to the invention according to claim 6 is the hydraulic device with the position sensor according to any one of claims 1 to 4, wherein the computation processing section, the communication device and the storage section are provided on a body housing-side of the hydraulic device.

Advantageous Effects of Invention

The hydraulic device with the position sensor according to the present invention includes a storage section having stored in advance thereon characteristics information of the hydraulic device readably, and causes a servo amplifier that drive-controls the hydraulic device to read out necessary characteristics information by communication connection, and, on the basis of the characteristics information, origin correction between the hydraulic device and a position sensor and optimization of flow rate characteristics are performed simply and conveniently. Accordingly, there is an advantage of enabling realization of simpleness and convenience at both an adjustment step in a manufacturing process and an adjustment step at a time when the hydraulic device is combined with a main machine at a site.

BRIEF DESCRIPTION OF DRAWINGS

FIG. 8 is a schematic diagram depicting an example of a conventional proportional electromagnetic directional flow rate control valve and servo amplifier, FIG. 8*a* depicts hydraulic graphic symbols representing the schematic configuration of the directional flow rate control valve and FIG. 8*b* is a circuit diagram depicting a state where the directional flow rate control valve is connected to the servo amplifier.

DESCRIPTION OF EMBODIMENTS

Figure 1:
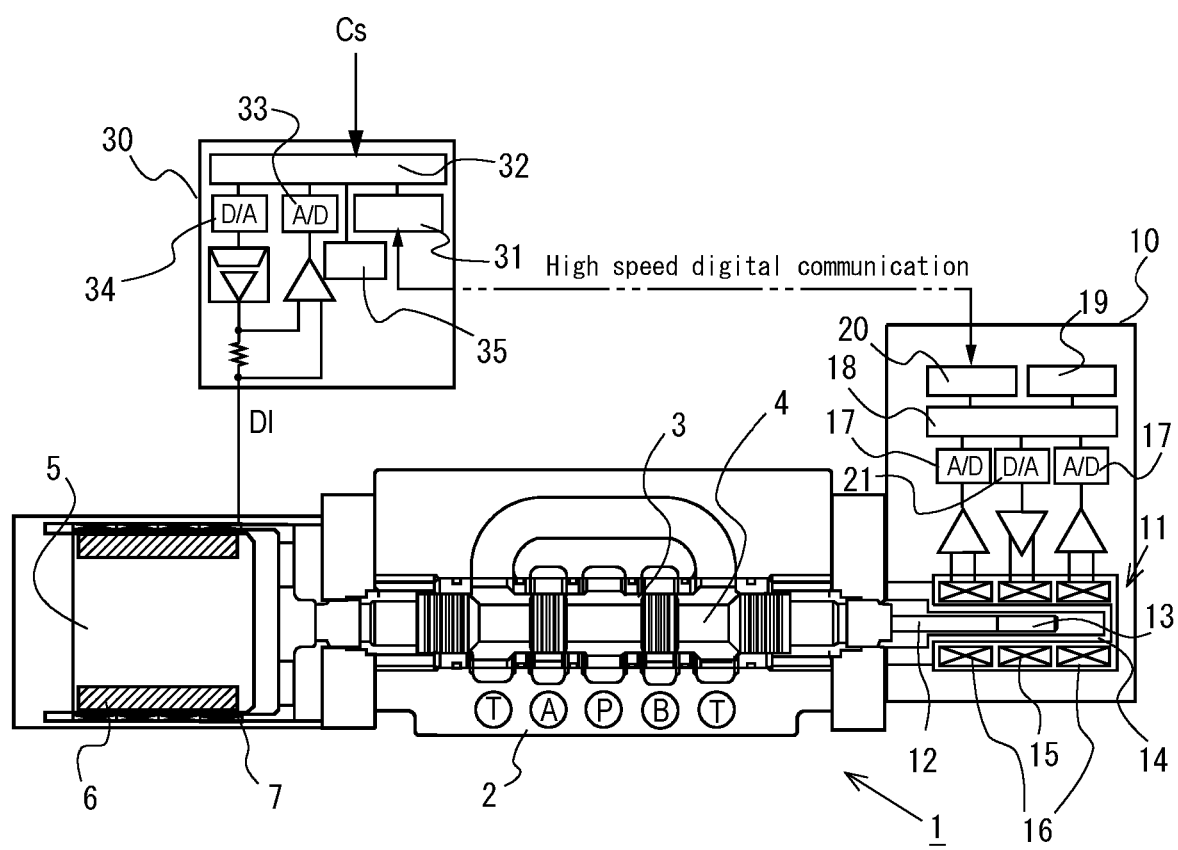
FIG. 1 is a schematic configuration diagram depicting a hydraulic linear servo valve as the hydraulic device with the position sensor according to a first embodiment of the present invention in the servo amplifier-connected state.

The hydraulic device with the position sensor according to the present invention is the hydraulic device with the position sensor that is the hydraulic device drive-controlled by a servo amplifier in accordance with a command signal, integrally includes a position sensor that generates an output signal according to a position of a valve member that determines a valve opening and a hydraulic working fluid flow direction, and is feedback-controlled by the servo amplifier on a basis of a deviation between a command value of the command signal and a position sensing value based on the output signal, the hydraulic device with the position sensor including: a computation processing section that performs a computation process on an output from the position sensor, and outputs the position sensing value as a sensing signal; a communication device that transmits the sensing signal to the servo amplifier, and also receives a signal from the servo amplifier; and a storage section having stored thereon characteristics information of the hydraulic device such that the characteristics information can be read out via the communication device, in which the characteristics information of the hydraulic device stored on the storage section at least includes calibration information and flow rate characteristics information which are measured and acquired in advance in a test stand in a manufacturing process of the hydraulic device, the calibration information including a position sensing value from the position sensor and a characteristics value of the hydraulic device, which values are associated with each other, and the flow rate characteristics information including a flow rate of the hydraulic device in relation to the command signal, which flow rate and command signal are associated with each other.

With the configuration described above, any servo amplifier can be caused to read out, from the storage section, the calibration information of the position sensor obtained by associating the position sensing value from the position sensor and the characteristics value of the hydraulic device with each other, so it is possible to cause the servo amplifier to perform origin correction based on the characteristics information, without implementing minute adjustment work of causing the origins of a control mechanism of the hydraulic device and the position sensor to match in advance during a manufacturing process. Thereby, for example, it becomes unnecessary to adjust the installation position of a position sensor or finely adjust the installation length of a core by manual screwing while actually supplying power and looking at the flow rate of a hydraulic working fluid which had conventionally been performed when an LVDT position sensor is mounted on a spool end of a hydraulic servo valve, fixation attachment is sufficient for the position sensor, so the manufacturing process is made significantly simple and convenient.

Furthermore, in the present invention, any servo amplifier can be caused to read out, from the storage section, the flow rate characteristics information in relation to command signals via the communication device, so it becomes possible to cause the servo amplifier to perform control suited for characteristics unique to the hydraulic device, without making it necessary to perform adjustment of a main machine by performing test operation at a site.

For example, on the basis of the flow rate characteristics information having been read out, a neutral insensitivity zone that is seen in the flow rate characteristics of the hydraulic device can be eliminated by amplifier control, and the flow rate characteristics in relation to command signals can be made substantially linear. Thereby, it becomes unnecessary to perform control taking into consideration valve characteristics of the hydraulic device during system adjustment.

In addition, in a case that it is desired to enhance the control precision of a hydraulic cylinder, a hydraulic servo valve with a zero lap structure in which there is a slight amount of a ports-P→A flow and a ports-P→B flow even at the spool zero position is adopted, but a hydraulic pressure always leaks out even at a time when the hydraulic cylinder is stopped, so there is significant energy loss. In view of this, for a main machine that mainly uses speed control of a hydraulic cylinder which makes it unnecessary to place emphasis on the control precision at the spool zero position, a hydraulic servo valve with an overlap structure in which a hydraulic fluid does not flow at the spool zero position, but starts flowing when the spool is at a position that is off the zero position to some extent is adopted. As products with this overlap structure, there is one that has, as a servo amplifier functionality, an adjustment mechanism of causing a hydraulic cylinder to operate at a minimum speed after a spool is moved to an overlap end when speed command signals change from zero to a minimum speed. However, because there are variations in terms of a spool overlap end mentioned here in relation to defined movement amounts, it had conventionally been necessary to perform adjustment while checking operation of the hydraulic cylinder at a time of activation of a main machine or at a time of hydraulic servo valve replacement. In contrast to this, in the present invention, a state equivalent to a case that such adjustment has been performed can be attained simply by causing a servo amplifier to read out flow rate characteristics information of a hydraulic servo valve from a storage section without complicated adjustment work, so actual use can be started simply and conveniently at a time of activation of a main machine or a time of hydraulic servo valve replacement in a short time.

Figure 4:
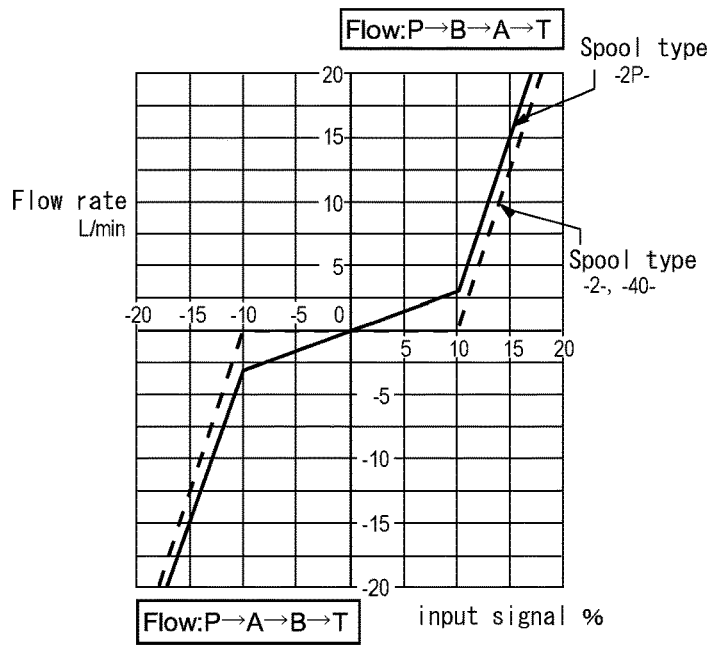
FIG. 4 is a diagram depicting an example of flow rate characteristics that change depending on large flow rates and small flow rates of a hydraulic servo valve (longitudinal axis: hydraulic fluid flow rates L/min in relation to horizontal axis: input signals %).

In addition, in a case of a main machine that performs speed feedback control of a hydraulic cylinder, if flow rate characteristics of a hydraulic servo valve are designed such that, as depicted in FIG. 4, the flow rate characteristics of the hydraulic servo valve change significantly at large flow rates and small flow rates, the feedback control of the hydraulic cylinder becomes unstable in some cases because there are rapid flow rate gain changes around change points of flow rates. In the present invention, it is possible to cause the servo amplifier to read out the flow rate characteristics information including such change points from the storage section, so it becomes possible also to prevent rapid changes by causing the servo amplifier to make flow rate gains variable around the change points on the basis of the characteristics information.

Furthermore, depending on the type and operation type of a subject main machine, required flow rate characteristics specifications and control operation vary, and the hydraulic device corresponding to the subject main machine is selected, but the hydraulic device has a control program suited for its own control. By using the control program, a servo amplifier can appropriately drive-control the hydraulic device. In the hydraulic device according to the present invention, the control program and control constants are also stored readably on the storage section, and thereby, when the hydraulic device is actually incorporated into a main machine, it is possible to cause the servo amplifier connected together with the hydraulic device to read out the control program and control constants of the hydraulic device via the communication device. Accordingly, as long as the hydraulic device is one that includes its control program in a storage section, it becomes possible for a servo amplifier to support the hydraulic device with various special designs whose control programs are not stored on the amplifier itself, so it is not necessary to prepare, as a paired servo amplifier, a servo amplifier dedicated for each unit of the hydraulic device.

Figure 5:
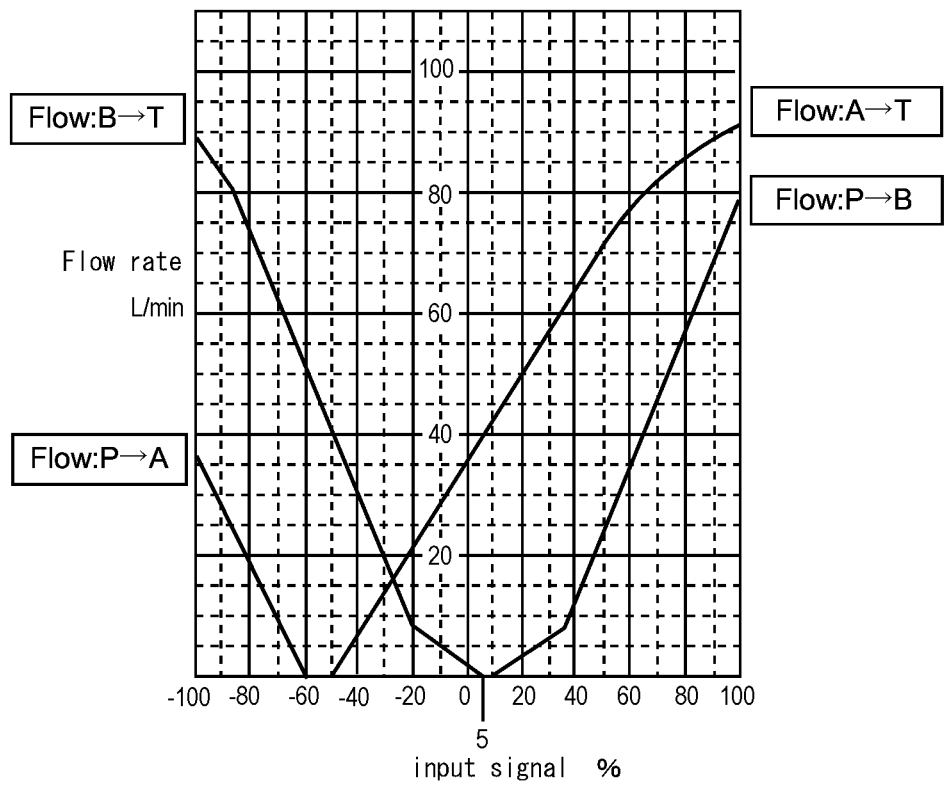
FIG. 5 is a diagram depicting an example of flow rate characteristics suited for an injection molding machine of a hydraulic servo valve (longitudinal axis: hydraulic fluid flow rates L/min in relation to horizontal axis: input signals %).

For example, in a case that a hydraulic cylinder as a main machine is an injection molding machine, the hydraulic device designed to have flow rate characteristics suited for the injection molding machine is selected and combined, but the control precision around the zero-crossing of the spool is not important, and either control of a hydraulic pressure equivalent to the output load of the hydraulic cylinder or control of a flow rate equivalent to the speed of the hydraulic cylinder is selected depending on the operation type of the main machine. Because of this, there is a change point of flow rate characteristics at an intermediate portion in the movable range of the spool as depicted in FIG. 5, so the hydraulic device is drive-controlled appropriately by a control program that increase the spool movement control gain such that the reproducibility and disturbance reduction are improved at the intermediate change point. Accordingly, by storing the control program on the storage section of the hydraulic device, it becomes possible to cause even an existing servo amplifier not including the control program to read out the control program from the storage section of the hydraulic device, and perform appropriate drive control of the hydraulic device.

Figure 6:
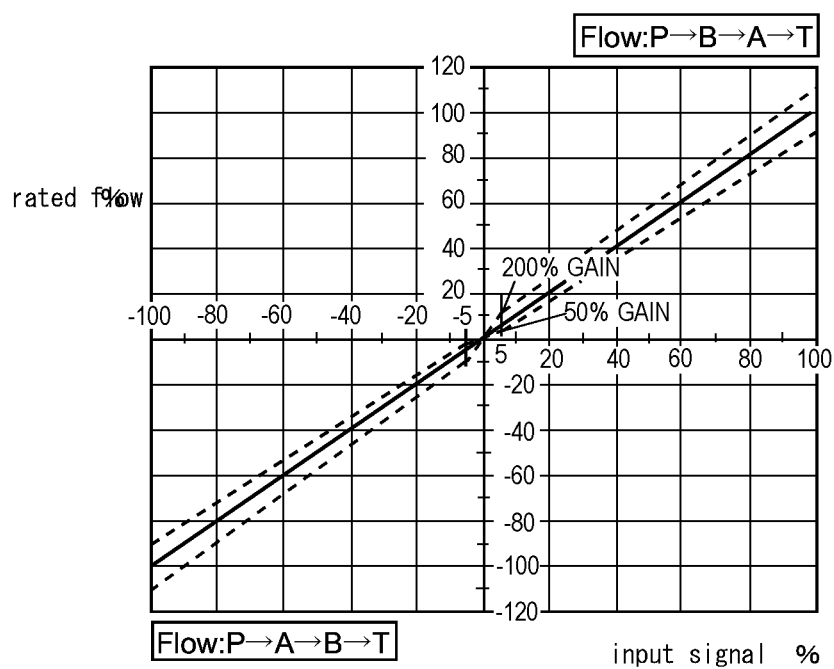
FIG. 6 is a diagram depicting an example of flow rate characteristics representing linearity and continuity around a zero-crossing of a hydraulic servo valve (longitudinal axis: rated flow rates L/min in relation to horizontal axis: input signals %).

In addition, in the hydraulic device that is selected in a case that position control of a hydraulic cylinder is important, the influence, on the performance of a main machine, of linearity and continuity around a zero-crossing where both the ports-P→A flow and the ports-P→B flow become zero as depicted in FIG. 6 in a four-port (A, P, B, T) structure is significant, so a control program that enhances the spool control precision by causing a hydraulic servo valve drive current around the zero-crossing to make driving forces in the P→A direction and the P→B direction balanced is used. By storing the control program on the storage section of the hydraulic device, it becomes possible to cause even a servo amplifier not having stored thereon in advance the control program to read out the control program from the storage section, and perform appropriate drive control of the hydraulic device.

As mentioned above, if a control program and control constants that are compatible with the hydraulic device are stored on a storage section of the hydraulic device, a servo amplifier can read out the control program and control constants from the storage section at a time when connection is established with the hydraulic device, and can use the control program and control constants for drive control of the hydraulic device. Accordingly, simpleness and convenience which are equivalent to or more than in a case that the hydraulic device and the servo amplifier are integrated as a pair or the servo amplifier is directly mounted on the hydraulic device in a manufacturing process can be realized at an adjustment step at a time of incorporation into a main machine, without such integration or mounting.

In addition, even if only the servo amplifier malfunctions after the elapse of a long time since the hydraulic device incorporated into the main machine started being used, it is possible to cause a newly connected servo amplifier to read out flow rate characteristics information as characteristics information of the hydraulic device, and the control program and control constants again, so it is sufficient if only the servo amplifier is replaced, not requiring replacement of the hydraulic device as paired hydraulic device. In addition, even in a case that the hydraulic device is changed, if characteristics information is readably stored on a storage section of new hydraulic device, it is possible to cause the existing servo amplifier to read out the characteristics information of the new hydraulic device, and be compatible with it.

Note that it is simple and convenient if a control program and control constants are associated with a number created in accordance with the type of the compatible hydraulic device, and reading, rewriting and the like of a corresponding control program and control constants are managed by using the number. For example, there can also be a case that a servo amplifier combined with a subject main machine together with the hydraulic device has already stored thereon control programs for various types of the hydraulic device. Accordingly, first, a number is read out from the storage section, and, if a control program with the corresponding number is already stored on the servo amplifier, the servo amplifier can select and use the control program stored on itself. Then, if the subject hydraulic device is one having a special design, and its control program has a number not matching any of the numbers of the existing control programs, it is sufficient if the servo amplifier reads out the special control program from the storage section of the hydraulic device. Note that control constants stored together with a control program on a storage section may be stored in a form in which the control constants are set in the program or in a form in which the control constants are treated singly.

Figure 7:
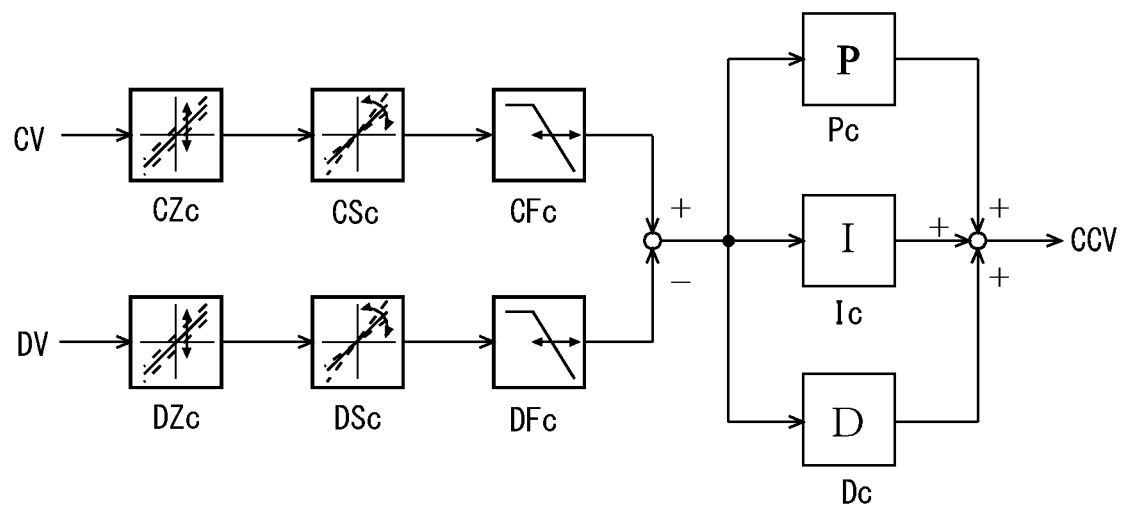
FIG. 7 is a control block diagram depicting a process of a feedback control computation of the hydraulic device in a servo amplifier.
Figure 9:
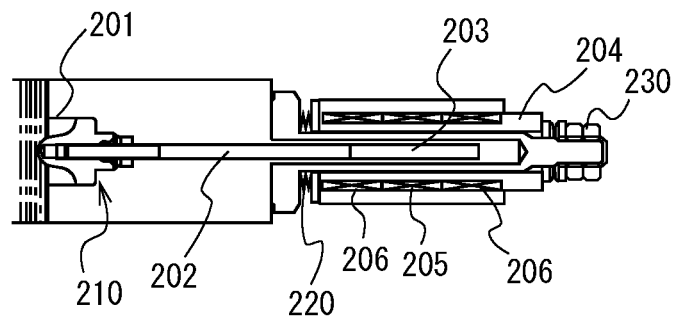
FIG. 9 is a schematic configuration diagram of a conventional spool position sensor (LVDT).
Figure 10:
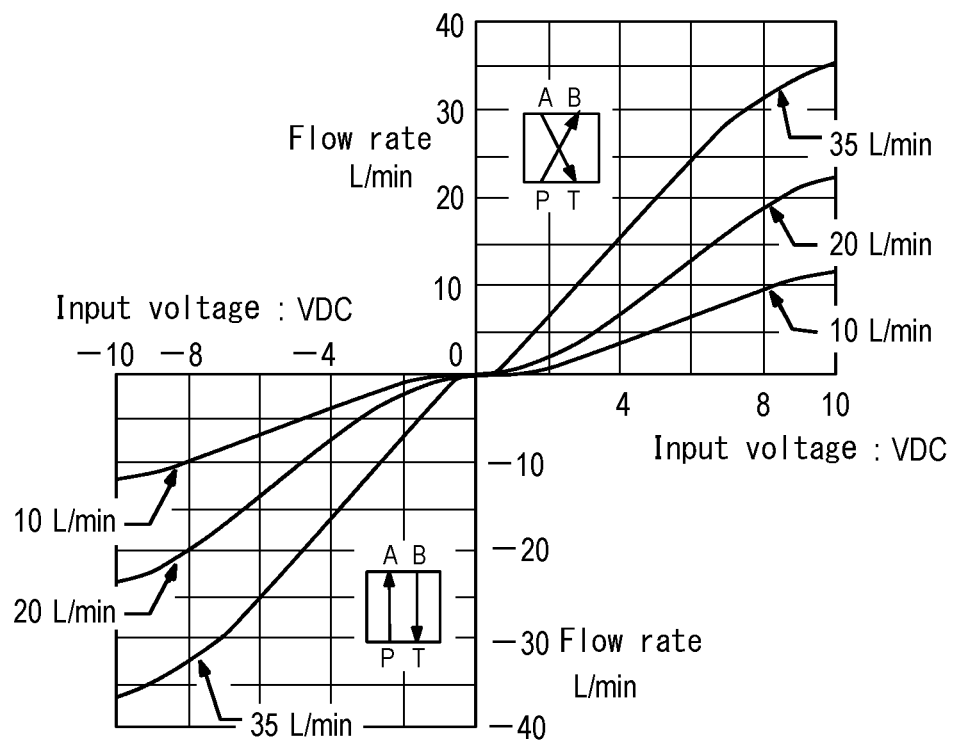
FIG. 10 is a diagram depicting characteristics of flow rates (longitudinal axis: hydraulic fluid flow rates L/min) in relation to command signals (horizontal axis: input voltages VDC) of the directional flow rate control valve in FIG. 8.

In accordance with a command signal, a servo amplifier feedback-controls a control mechanism of the hydraulic device on the basis of a deviation between the command value and a position sensing value of a sensing signal from a position sensor. In this case, as depicted in FIG. 7, first, calibration computation is performed on a command value CV and a position sensing value DV in order to obtain a matching relationship of them, and then a deviation amount which is the difference between them is obtained. At this time, there are coefficient constants (CZc-CSc, DZc-DSc) of zero-span calibration computation, and furthermore coefficient constants (CFc, DFc) of a filtering process for them are necessary. Then, on the deviation amount between the calibrated command value and position sensing value, computation using coefficient constants (a proportional coefficient Pc, an integral action coefficient Ic and a differential coefficient Dc) of each member in PID control is performed, and a control command value CCV of a drive current is calculated. Similar feedback control computation is performed also on the drive current, and a control command value to a drive current control mechanism is determined.

In the present invention, values related to control compensation such as PID control constants are stored in advance on the storage section, and thereby it is possible to cause the servo amplifier to read out coefficient constants necessary for feedback control, update coefficient values on a control compensation computation program, and perform optimum control of the hydraulic device. Furthermore, at a time of design change of the hydraulic device or replacement with the hydraulic device having a new special design, this can be coped with simply by changing coefficient values in the storage section, and causing the servo amplifier to read out them, and update the existing coefficient values, and the simpleness and convenience are enhanced as it becomes unnecessary to replace or readjust the servo amplifier itself.

In addition, in the present invention, if a current setting value for abnormality detection is further stored on the storage section, the servo amplifier can compare the current setting value for abnormality detection read out at a time when connection is established, with a drive current measurement value that is measured at each instance of activation of a main machine into which the hydraulic device is incorporated, and can output a warning signal in a case that an overcurrent equal to or higher than the current setting value is measured. If the warning signal is generated immediately before actual use at a time of the next main machine activation, a user can grasp an abnormal state easily before the actual use. Thereby, it is possible to perform maintenance of a valve mechanism, replace a component, and so on, so it is possible to avoid activation of the main machine in an abnormal state.

It is sufficient if such measurement of a drive current at each instance of main machine activation is performed by moving a spool over its entire operating range automatically at a constant speed at each instance of activation of the servo amplifier, and measuring spool drive currents at that time at several points. Typically, a power supply of a servo amplifier is turned on in advance when a hydraulic system of a main machine is activated, so immediately after the power supply of the servo amplifier is turned on, the main machine-side does not operate even if the spool position of hydraulic device changes, and also it is easy to set a condition that there are no problems even if the spool position of the hydraulic device is changed by inputting a signal such as a signal for turning off a hydraulic pressure to the servo amplifier. It is sufficient if the current setting value for abnormality detection is set to an overcurrent value slightly smaller than a threshold regarded as an abnormality of a drive current of the hydraulic device. In a case that foreign matters have accumulated between a spool and a sleeve or the spool gets stuck, and it becomes difficult for the spool to move, an overcurrent exceeding the current setting value is generated, and it becomes possible also for the servo amplifier to output a warning signal on the basis of this.

Furthermore, because the storage section according to the present invention has stored thereon, as a drive current initial value, a drive current value measured by moving a valve member before shipment of the hydraulic device, and has a functionality of storing and accumulating over time a drive current measurement value at each instance of main machine activation, it becomes possible for the servo amplifier to predictively diagnose a timing at which the current setting value for abnormality detection is reached on the basis of temporal changes from the drive current initial value, and to inform the timing, output a caution signal immediately before the timing, and so on. A user can grasp that the lifetime of a valve mechanism has come close to the end or there is a possibility of a malfunction in accordance with the caution signal, and can prepare for maintenance or replacement. Furthermore, it is possible to inform the possibility of occurrence of some malfunctioning state by adopting configuration in which a caution signal is output also in a case that a change of a current value as compared with the previous measurement value is rapid.

Note that similarly to conventional technologies, at a step of sensing the position of a valve member such as a spool, an analog signal output from a position sensor is digitized via an A/D convertor, a computation process is performed on the digital signal, and a position sensing value is transmitted as a digital sensing signal to the servo amplifier via the communication device. Accordingly, it is sufficient if the communication device according to the present invention is one that can perform digital communication transmission and reception with the servo amplifier, and preferably is a communication device having transmission/reception functionalities that enable so-called high-speed digital communication, and further enable long-distance transfer also. For example, an industrial field bus communication system or an industrial Ethernet communication system can be adopted for establishing communication connection between the servo amplifier and the hydraulic device, but communication connection may be set as appropriate in accordance with the actual distance between and environment of the servo amplifier and the main machine-side hydraulic device.

In addition, the storage section according to the present invention may be a rewritable non-volatile memory, and examples of the computation processing section include a CPU or a digital signal processing IC such as a DSP or an FPGA. Therefore, digital communication functionalities necessary for the communication device are a functionality of transmitting a position sensing signal from the computation processing section, a functionality of transmitting a value read out from a non-volatile memory and of receiving a value to be written into the non-volatile memory, and a functionality of transmitting and receiving check codes for sensing the accuracy of communication.

Note that in the present invention, the computation processing section, the storage section and the communication device other than the position sensor directly attached to the valve member can be arranged around the position sensor in one possible configuration, and can be arranged apart from the position sensor and on the side of the hydraulic device body in another possible configuration. For example, in a case that they are provided integrally in the same housing with the position sensor, they can be manufactured in advance in a form in which they are integrated as a position sensing apparatus, and can be attached simply and conveniently to various types of the hydraulic device. In addition, in this case, by providing them on the position sensor-side, the number of components can be reduced for the hydraulic device, and assembly at a time of manufacturing is simple and convenient. It should be noted that depending on the types of the hydraulic device and a position sensor, there can also be a case that a casing design as the position sensing apparatus that matches the hydraulic device is necessary or it is necessary to adopt a shape design that makes an attachment section on the hydraulic device-side compatible.

On the other hand, in the case of the configuration in which the computation processing section, the storage section and the communication device are provided on the body housing-side of the hydraulic device in a state that they are separated from the position sensor, regardless of the shape of the hydraulic device itself, it is possible to arrange them together as a sensor amplifier in a simple box-shaped casing, and it is possible to arrange them at a location on the body housing of the hydraulic device where it is easy to attach them or at any location where there is enough room in terms of the outline shape occupancy dimension. Particularly, even in a case that outline shape dimension of the shape of the position sensor also differs depending on differences in the sensible movement length, the withstanding pressure capability required for example in a case of a structure in which there is an inflow due to a hydraulic pressure to a core-side in an LVDT, or the like, it is not necessary to take into consideration the outline shape on the sensor amplifier-side separated from the position sensor, so the degrees of freedom of design of the hydraulic device body, the position sensor and the sensor amplifier are high.

It should be noted that the sensor amplifier separated from the position sensor is manufactured and attached in a manufacturing process of the hydraulic device, so a structure for protection of weak analog signal wires for signals output from the position sensor become necessary also, and the number of components and manufacturing steps of the hydraulic device increase. Accordingly, it may be selected as appropriate in accordance with the subject hydraulic device whether to adopt the configuration in which the computation processing section, the storage section and the communication device are provided integrally on the position sensor-side, and attached as a position sensing apparatus to the hydraulic device or the configuration in which they are arranged on the side of the body of the hydraulic device as a sensor amplifier separated from the position sensor.

First Embodiment

As the hydraulic device with the position sensor according to a first embodiment of the present invention, a direct-operated hydraulic linear servo valve 1 having a position sensing apparatus 10 that also includes, in the same housing with an LVDT as a position sensor 11, a storage section having stored thereon characteristics information of the hydraulic device, and is attached to an end of a valve body 2 is depicted in a schematic configuration diagram of FIG. 1, and the schematic configuration diagram depicts a state where the direct-operated hydraulic linear servo valve 1 is connected with a servo amplifier 30.

The hydraulic linear servo valve 1 in the present embodiment includes the approximately tubular valve body 2, a linear motor section 5 and the position sensing apparatus 10. The valve body 2 includes a sleeve 3, a spool 4 that slides in the sleeve 3 and four ports (P, A, B, T). The valve body 2 has a zero lap structure in which the ports (P, A, B, T) are closed when the spool 4 is at its neutral point, and when the spool 4 moves from the neutral point, the ports are opened and a hydraulic fluid flows in accordance with the movement amount.

The linear motor section 5 includes a voice coil motor in which the movable coil 7 supplied from the servo amplifier 30 with a drive current DI according to a command signal Cs being caused to make reciprocating motions in a magnetic field generated by a rare earth permanent magnet 6 such as neodymium, iron or boron, and directly drives the spool 4 coupled to a movable coil 7 by the reciprocating motion of the movable coil 7.

In the position sensing apparatus 10, the LVDT as the non-contacting, highly-responsive magnetic spool position sensor 11 is attached to an end of the spool 4. That is, a core 13 is fixed to the tip of a rod 12 that is provided as an extended part of the spool 4, a pipe member 14 into which the core 13 is inserted is provided as a protrusion from the housing side face of the valve body 2, and a sensing coil is composed of a primary coil 15 wound at the middle and a pair of secondary coils 16 wound symmetrically on both sides of the primary coil 15, around the periphery of the pipe member 14. Differential voltages between the secondary coils 16 that change corresponding to the position of the core 13 in the sensing coil that moves along with the spool 4 relative to the primary coil 15 having undergone primary excitation are output. Analog signals of the voltage outputs are digitized by A/D convertors 17, and then are subjected to digital signal processing at a computation processing section 18, and digital sensing signals as position sensing values are obtained. The obtained position sensing signals are transmitted from a communication device 20 to a communication device 31 of the servo amplifier 30 mentioned later by high-speed digital communication.

Furthermore, the position sensing apparatus 10 in the present embodiment includes a storage section 19 including a non-volatile memory. The storage section 19 has stored thereon characteristics information of the hydraulic linear servo valve 1 readably, and also has stored thereon a control program and control constants compatible with the hydraulic linear servo valve 1 readably and rewritably with a number given thereto. That is, the position sensing apparatus 10 includes the position sensor (LVDT) 11, the A/D convertors 17, a D/A convertor 21, the computation processing section 18, the storage section 19 and the communication device 20 that are arranged together integrally in the same housing.

It is sufficient if the servo amplifier 30 has the built-in communication device 31 that establishes high-speed digital communication connection with the communication device 20 of the position sensing apparatus 10 when being connected with the hydraulic linear servo valve 1 and activated. Then, similarly to conventional technologies, a computation processing section 32 that determines a control command value on the basis of a deviation between a command signal Cs from a controller on the main machine-side and a sensing signal given as feedback from the position sensing apparatus 10, and controls a current to be supplied to the linear motor section 5 in accordance with the control command value is included. Because the characteristics information of the hydraulic linear servo valve 1 can be read out from the storage section 19 via the communication devices 31 and 20 at a time of communication connection with the position sensing apparatus 10, the computation processing section 32 can simply and conveniently perform appropriate control of the linear motor section 5 by using a control program, control constants, flow rate characteristics and the like that are included in the characteristics information and compatible with the hydraulic device. Note that the servo amplifier 30 has stored thereon control programs associated with numbers of various types of the hydraulic device that had been read in into an amplifier memory 35 in the past, in some cases.

The following is a list of specific examples of characteristics information stored on the storage section 19.

(1) The model and serial number of a position sensor (an LVDT in the present embodiment)
(2) Calibration values of a position sensor (to be used only at a time of a manufacturing inspection of the position sensor)
(3) The model and serial number of the hydraulic device (a linear servo valve in the present embodiment)
(4) A control program number compatible with the hydraulic device
(5) Binary codes of the control program in (4)
(6) Control constants optimum for the hydraulic device
(7) Flow rate values (calibration information) in relation to position sensing values measured at a time of a manufacturing inspection of the hydraulic device, and flow rates (flow rate characteristics information) in relation to command signals
(8) A drive current initial value and a current setting value for abnormality detection (drive current characteristics information) in relation to a position sensing value measured by moving a spool at a time of a manufacturing inspection of the hydraulic device at a constant speed
(9) The elapsed drive time and number of times of activation of a hydraulic mechanism
(10) A drive current value (for predictive diagnosis) in relation to the elapsed time of each instance of activation of the hydraulic device, and a position sensing value measured by moving a spool at a constant speed The following is an example of an adjustment step to be performed in a manufacturing process of the hydraulic linear servo valve 1 equipped with the position sensing apparatus 10 in the present embodiment. First, in the position sensing apparatus 10, the model and serial number of the LVDT as the position sensor 11, and also the effective movement range of the model are stored on the storage section 19. Furthermore, the core 13 is arranged at the mechanical neutral point and rated movement point of the LVDT, and adjustment data is stored on the storage section 19 such that a digital signal is output at each point. In addition, the storage section 19 has stored thereon also the model and serial number of the hydraulic linear servo valve 1 to which the position sensing apparatus 10 is attached.

On the other hand, the body of the LVDT 11 and the spool 4 are assembled such that the neutral point of the valve mechanism where the spool 4 is positioned in the sleeve 3 of the valve body 2 and the mechanical neutral point of the LVDT match, when the position sensing apparatus 10 is attached to the hydraulic linear servo valve 1. After the assembly, valve flow rates in relation to position sensing values output in accordance with the movement position of the core of the LVDT are measured while the spool 4 is being moved by using an inspection amplifier, and a position sensing value of the neutral point at which outflow ports of the valve switch, and a position sensing value at which the rated flow rate of each port is obtained are stored on the storage section 19. Flow rate characteristics in relation to the position sensing values are used as calibration information in origin correction by the servo amplifier 30 before actual use, and minute fine adjustment of the attachment position of the LVDT becomes unnecessary.

Furthermore, coefficients of flow rate values in relation to position sensing values are calculated from measurement results, positions at which the coefficients clearly change are decided as change points unique to the hydraulic linear servo valve 1, and a position sensing value and a coefficient corresponding to each change point are stored on the storage section 19. In addition, drive current values in relation to the position sensing values are measured, and the drive current characteristics are also stored on the storage section 19. The drive current characteristics are used as fiducial characteristics for predictive diagnosis to be performed later. Furthermore, before shipment, a control program and control constants compatible with the hydraulic linear servo valve 1 are stored on the storage section 19 with numbers given thereto.

Next, operation after the hydraulic linear servo valve 1 according to the present embodiment is connected to the servo amplifier 30, and the servo amplifier 30 is activated is depicted below along a flowchart in FIG. 2. First, when the servo amplifier 30 is activated, communication connection is established with the position sensing apparatus 10 (S100).

In the state where the communication connection is established, (1) the model and serial number of the position sensor are read out from the storage section 19 via the communication devices 20 and 31 (S101), and a compatibility decision about the model and serial number (S102) is made. If the model and serial number are not compatible, a warning signal is output, and the activation of the servo amplifier 30 is stopped (S103). If it is decided that the model and serial number of the position sensor are compatible, (3) the model and serial number of the hydraulic device (hydraulic linear servo valve 1) are read out from the storage section 19 (S104), and a compatibility decision about the model and serial number is made (S105). If the model and serial number are not compatible, a warning signal is output, and the activation of the servo amplifier 30 is stopped (S106). If it is decided that the model and serial number of the hydraulic device are compatible, (4) a control program number is read out from the storage section 19 (S107). A number decision as to whether the number is abnormal or normal is made (S108), and in a case that it is decided that the number is abnormal, a warning signal is output, and the activation of the servo amplifier 30 is stopped (S109).

In a case that it is decided that the number is normal, a decision as to whether there is a control program that matches the control program equivalent to the number matches or the control program equivalent to the number is special is made (S110). That is, on the basis of the control program number, it is decided whether the control program matches any of control programs stored already on the amplifier memory 35 of the servo amplifier 30 or is a special control program that does not exist in the amplifier memory 35. If it is decided on the basis of the number that there is already a matching control program, the control program with the number is selected on the amplifier memory 35 in the servo amplifier 30 (S111).

On the other hand, in a case that it is decided at the control program number matching/specialness decision (S110) on the basis of the number that the control program is special, (5) binary codes of the control program are read out from the storage section 19, and an area in the amplifier memory 35 where the control program is arranged is rewritten (S120). After the control program is identified in the process mentioned above, furthermore, the optimum control constants are read out, and the control program constants are rewritten (S112). Next, (7) flow rate characteristics information at a time of a manufacturing inspection of the hydraulic device is read out from the storage section 19, and a target value correction curve of positions in relation to command values CV to the servo amplifier 30 is updated (S113).

Thereafter, (8) drive current characteristics information is read out from the storage section 19, the linear motor section 5 is caused to be driven autonomously, the spool 4 is moved at a constant speed over the entire operating range, and a drive current is measured (S114). Then, a diagnostic decision is made by comparing the drive current measurement value and an overcurrent setting value as a current setting value for abnormality detection included in the drive current characteristics having been read out (S115). In a case that it is decided as a result of the diagnosis that there is an abnormality, a warning signal is output (S116). In accordance with the warning signal, a user can understand that the valve mechanism of the hydraulic linear servo valve 1 is malfunctioning, perform a specific inspection, and perform maintenance or component replacement.

If it is decided as a result of the diagnosis that there is not an abnormality, (9) the elapsed drive time and number of times of activation of the hydraulic device up to the previous time, and (10) the elapsed time of each instance of activation of the hydraulic device and position sensing values measured by moving the spool at a constant speed up to the previous time are read out from the storage section 19, the current number of times of activation is updated, and also a result of the measurement of the drive current value performed at Step S114 is stored and accumulated (S117). Here, temporal changes from a drive current initial value as drive current characteristics also may be updated, and a timing at which the abnormality drive current value is reached may be predictively diagnosed in accordance with extension of a change rate of the temporal changes or sensing of a point with a significant change. Then, in accordance with the control program whose control constants have been rewritten and which has been optimized, normal drive control of the hydraulic linear servo valve 1 is performed in accordance with a command signal from a controller on the main machine-side (S118). When the normal operation is completed, and the power supply of the servo amplifier 30 is interrupted, communication with the position sensor 10 is performed by using electrical power in a power storage section inside the amplifier, a data signal of the elapsed time of the current activation is sent, and the elapsed drive time and number of times of activation are updated at the storage section 19 (S119).

As mentioned above, it is possible to cause any servo amplifier to read out the characteristics information of the hydraulic device stored in advance on the storage section 19, and to perform adjustment simply and conveniently in the hydraulic linear servo valve 1 in the present embodiment, so both a minute adjustment step in a manufacturing process, and an adjustment step performed while test operation of a main machine is being performed at a site become unnecessary, and superior simpleness and convenience can be attained.

Second Embodiment

Whereas the storage section 19 and equipment required for processes from digitization of analog signals output from the position sensor 11 to output of sensing signals are arranged in the same housing with the position sensor 11 to integrally form the position sensing apparatus 10 in the configuration depicted in the first embodiment mentioned above, the present invention is not limited to this, but arrangement in which the position sensor 11 and other equipment are separated is also possible.

Figure 3:
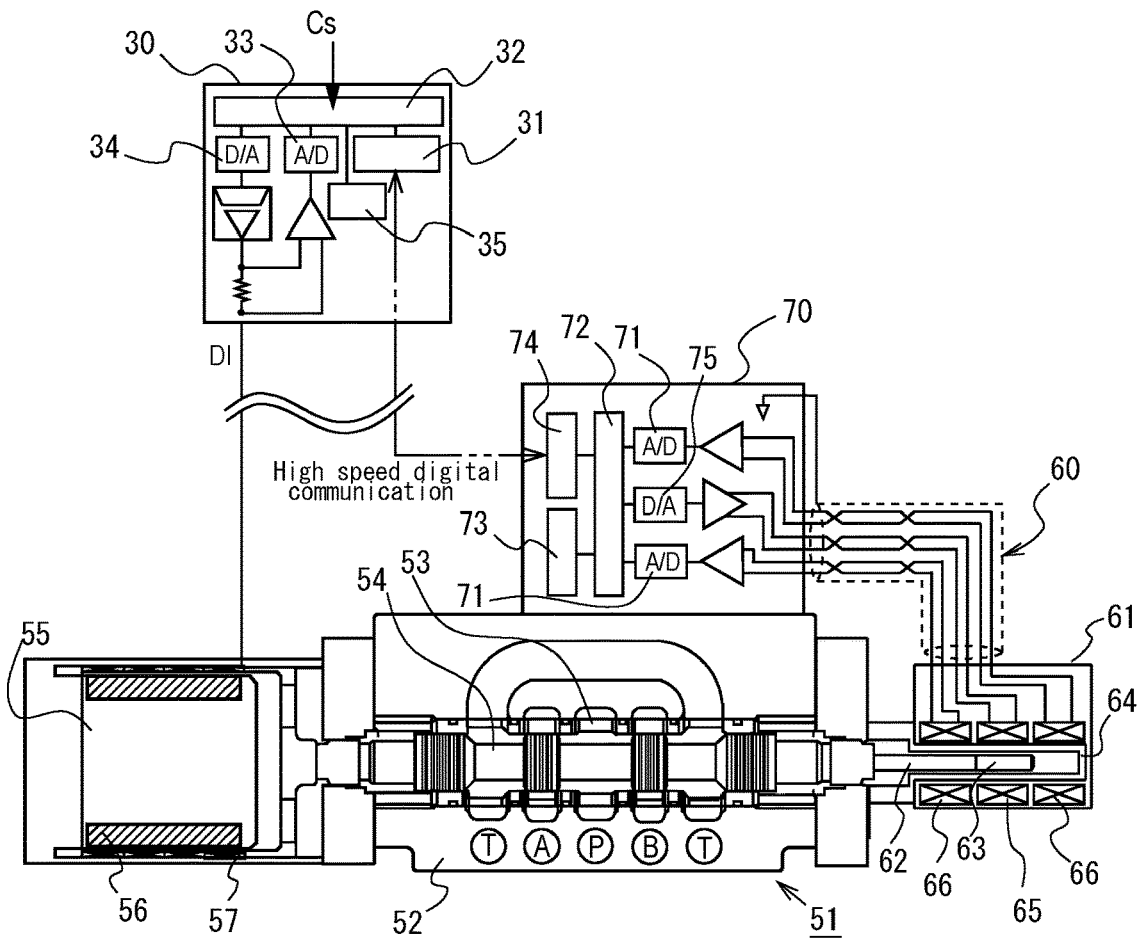
FIG. 3 is a schematic configuration diagram depicting the hydraulic linear servo valve as the hydraulic device with the position sensor according to a second embodiment of the present invention in the servo amplifier-connected state.

In view of this, as a second embodiment of the present invention, a hydraulic linear servo valve 51 having configuration in which a storage section having stored thereon characteristics information of the hydraulic device is separated from a position sensor and mounted on the housing-side of a valve body of the hydraulic device is depicted in a schematic configuration diagram in FIG. 3, and the schematic configuration diagram depicts a state where the hydraulic linear servo valve 51 is connected with the servo amplifier 30. In the present embodiment, a sensor amplifier 70 housing, in a box-shaped casing, the equipment including a storage section 73 other than the position sensor arranged in the position sensing apparatus 10 in the first embodiment is formed, and attached to the housing-side of a valve body 52, and other configurations of the valve body 52 are the same those of the valve body 2 in FIG. 1.

That is, the valve body 52 of the hydraulic linear servo valve 51 in the present embodiment has an approximately tubular shape, is equipped with a linear motor section 55 one end side, and an LVDT as a position sensor 61 on the other end side, and has a zero lap structure including a sleeve 53, a spool 54 that slides in the sleeve 53 and four ports (P, A, B, T).

The linear motor section 55 directly drives the spool 54 by a movable coil 57 of a voice coil motor supplied, from the servo amplifier 30, the drive current DI according to the command signal Cs being caused to make reciprocating motions in a magnetic field of a permanent magnet 56.

The LVDT as the position sensor 61 has a core 63 that is fixed at the tip of a rod 62 that is provided as an extended part of the spool 54, and can make reciprocating movements inside a pipe member 64 that is provided as a protrusion from the housing side face of the valve body 52. In the present embodiment, weak analog signal wires 60 that extend from a primary coil 65 at the middle and a pair of secondary coils 66 on both sides of the primary coil 65 that composes a sensing coil at the periphery of the pipe member 64 to the outside of the housing of the position sensor 61 are disposed to reach the sensor amplifier 70.

In the LVDT, analog signals output as differential voltages between the secondary coils 66 that change corresponding to the position of the core 63 in the sensing coil that moves along with the spool 54 relative to the primary coil 65 having undergone primary excitation are transmitted to the sensor amplifier 70 via the weak analog signal wires 60, digitized by A/D convertors 71, and then are subjected to digital signal processing at a computation processing section 72, and digital sensing signals as position sensing values are obtained. The obtained position sensing signals are transmitted from a communication device 74 to a communication device 31 of the servo amplifier 30 by high-speed digital communication. In addition, the storage section 73 also is included in the casing of the sensor amplifier 70, and the storage section 73 has stored thereon the characteristics information (1) to (10) related to the hydraulic linear servo valve 51.

In a case that, as in the present embodiment, the A/D convertors 71, a D/A convertor 75, the computation processing section 72, and the storage section 73 and the communication device 74 are attached as the sensor amplifier 70 separated from the position sensor 61 on the body housing-side of the hydraulic device, this discrete sensor amplifier 70 is possible to easily cope with attachment of it to the hydraulic device with various outline shapes. Accordingly, as a result, the degrees of freedom of design of the hydraulic device body, the position sensor and the sensor amplifier can be increased.

Figure 2:
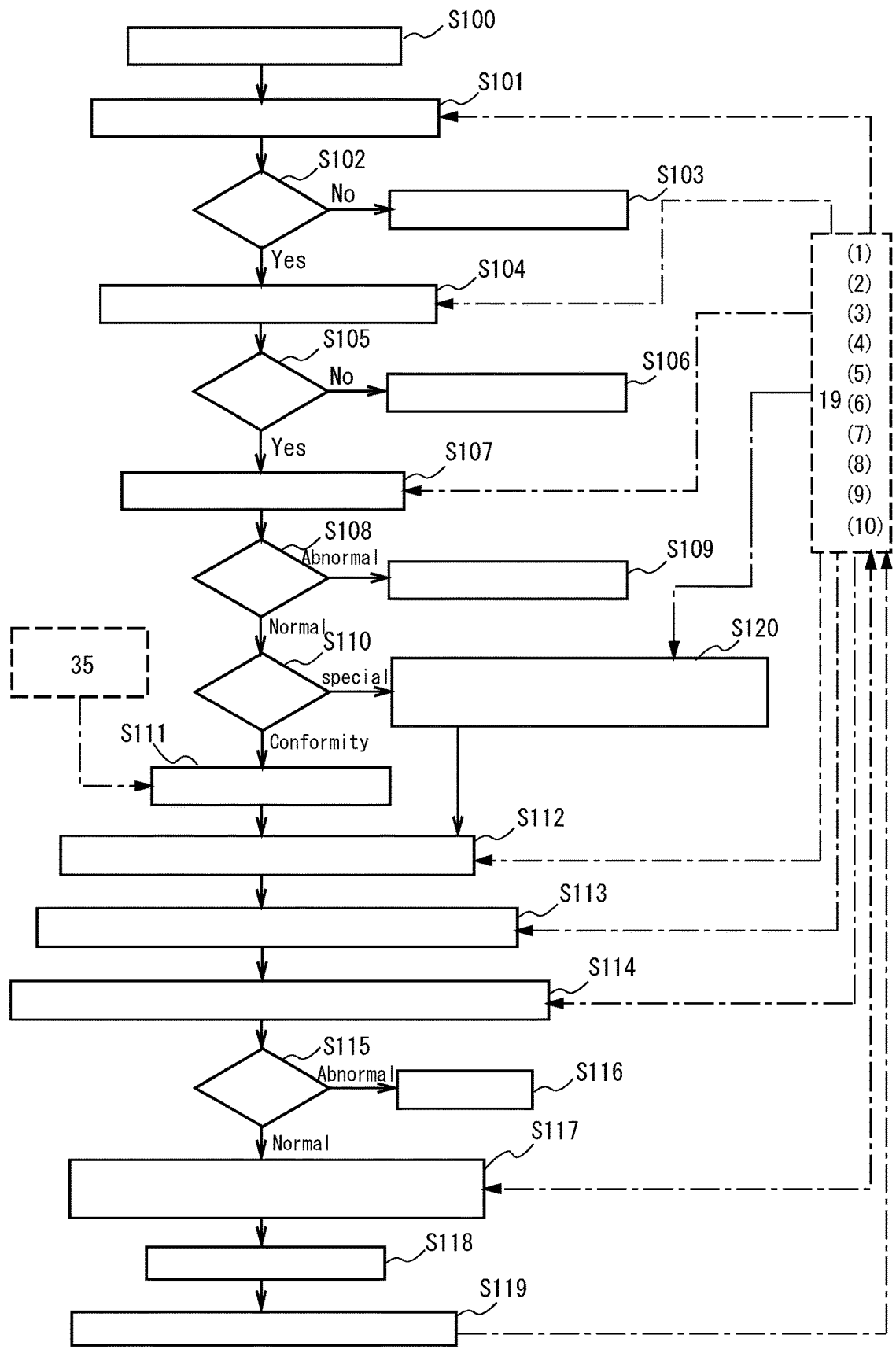
FIG. 2 is a flowchart depicting operation after the hydraulic linear servo valve in FIG. 1 is connected to a servo amplifier.

In addition, whereas the sensor amplifier 70 and the position sensor 61 are arranged separately in the present embodiment, after the servo amplifier 30 is connected and activated, and high-speed digital communication connection via the communication devices 74 and 31 is established between the sensor amplifier 70 and the servo amplifier 30, operation depicted in FIG. 2 is performed similarly to the first embodiment.

Note that whereas the hydraulic device includes the LVDTs as the position sensors in the cases depicted in the embodiments above, the present invention is not limited to these, but it is not needless to say that the present invention is similarly effective even in cases that other magnetic sensors, optical sensors or magneto-striction sensors that are capable of sensing of the positions of valve members are attached.

LIST OF REFERENCE SIGNS 1, 51: Hydraulic linear servo valve
2, 52: Valve body
3, 53: Sleeve
4, 54, 201: Spool
5, 55: Linear motor section
6, 56: Permanent magnet
7, 57: Movable coil
10: Position sensing apparatus
11, 61: Position sensor (LVDT)
12, 62, 202: Rod
13, 63, 203: Core
14, 64, 204: Pipe member
15, 65, 205: Primary coil
16, 66, 206: Secondary coil
17, 33, 71: A/D convertor
18, 72: Computation processing section
19, 73: Storage section
20, 74: Communication device
21, 34, 75: D/A convertor
30, 300: Servo amplifier
31: Communication device
32: Computation processing section
35: Amplifier memory
60: Weak analog signal wire
70: Sensor amplifier
200: Proportional electromagnetic directional flow rate control valve
210: Screw structure
220: Adjustment spring
230: Nut

The invention claimed is:

1. Hydraulic device with a position sensor that is the hydraulic device drive-controlled by a servo amplifier in accordance with a command signal, integrally includes the position sensor that generates an output signal according to a position of a valve member that determines a valve opening and a hydraulic working fluid flow direction, and is feedback-controlled by the servo amplifier on a basis of a deviation between a command value of the command signal and a position sensing value based on the output signal, the hydraulic device with the position sensor including:
a computation processing section that performs a computation process on an output from the position sensor, and outputs the position sensing value as a sensing signal;
a communication device that transmits the sensing signal to the servo amplifier, and also receives a signal from the servo amplifier; and
a storage section having stored thereon characteristics information of the hydraulic device such that the characteristics information can be read out via the communication device, wherein
the characteristics information of the hydraulic device stored on the storage section at least includes calibration information and flow rate characteristics information which are measured and acquired in advance in a test stand in a manufacturing process of the hydraulic device, the calibration information including a position sensing value from the position sensor and a characteristics value of the hydraulic device, which values are associated with each other, and the flow rate characteristics information including a flow rate of the hydraulic device in relation to the command signal, which flow rate and command signal are associated with each other.

2. The hydraulic device with the position sensor according to claim 1, wherein the characteristics information of the hydraulic device stored on the storage section further rewritably includes a control program and control constants that are compatible with the hydraulic device.

3. The hydraulic device with the position sensor according to claim 2, wherein the storage section further has stored thereon a current setting value for abnormality detection for comparison with a drive current measurement value measured by moving the valve member at each instance of activation of a main machine in which the hydraulic device is incorporated.

4. The hydraulic device with the position sensor according to claim 3, wherein the storage section has stored thereon, as a drive current initial value, a drive current value measured by moving the valve member before shipment of the hydraulic device, and also has a functionality of storing a drive current measurement value at each instance of activation of the main machine, and accumulating the drive current measurement value over time.

5. The hydraulic device with the position sensor according to claim 1, wherein the storage section further has stored thereon a current setting value for abnormality detection for comparison with a drive current measurement value measured by moving the valve member at each instance of activation of a main machine in which the hydraulic device is incorporated.

6. The hydraulic device with the position sensor according to claim 5, wherein the storage section has stored thereon, as a drive current initial value, a drive current value measured by moving the valve member before shipment of the hydraulic device, and also has a functionality of storing a drive current measurement value at each instance of activation of the main machine, and accumulating the drive current measurement value over time.

7. The hydraulic device with the position sensor according to claim 1, wherein the computation processing section, the communication device and the storage section are integrally provided in the same housing with the position sensor.

8. The hydraulic device with the position sensor according to claim 1, wherein the computation processing section, the communication device and the storage section are provided on a body housing-side of the hydraulic device.

* * * * *